(12) United States Patent
Hommura et al.

(10) Patent No.: US 8,597,855 B2
(45) Date of Patent: Dec. 3, 2013

(54) ELECTROLYTE MATERIAL, LIQUID COMPOSITION AND MEMBRANE/ELECTRODE ASSEMBLY FOR POLYMER ELECTROLYTE FUEL CELL

(75) Inventors: Satoru Hommura, Chiyoda-ku (JP); Susumu Saito, Chiyoda-ku (JP); Tetsuji Shimohira, Chiyoda-ku (JP); Atsushi Watakabe, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 329 days.

(21) Appl. No.: 12/843,441

(22) Filed: Jul. 26, 2010

(65) Prior Publication Data
US 2011/0027688 A1 Feb. 3, 2011

Related U.S. Application Data

(60) Provisional application No. 61/299,578, filed on Jan. 29, 2010.

(30) Foreign Application Priority Data

Jul. 31, 2009 (JP) .................. 2009-179066

(51) Int. Cl.
*H01M 8/10* (2006.01)
*H01M 4/02* (2006.01)
*B01J 39/20* (2006.01)

(52) U.S. Cl.
USPC ........... 429/494; 429/493; 429/492; 429/483; 526/243; 528/391

(58) Field of Classification Search
USPC .............. 429/48, 492, 493, 494; 526/243; 528/391
See application file for complete search history.

(56) References Cited

U.S. PATENT DOCUMENTS 7,429,428 B2 9/2008 Watakabe
7,667,083 B2 2/2010 Kaneko et al.
(Continued)

FOREIGN PATENT DOCUMENTS

EP 2 436 705 A1 4/2012
JP 2003-59494 2/2003
(Continued)

OTHER PUBLICATIONS

U.S. Appl. No. 13/214,273, filed Aug. 22, 2011, Watakabe, et al.
(Continued)

*Primary Examiner* — Mark Kaucher
(74) *Attorney, Agent, or Firm* — Oblon, Spivak, McClelland, Maier & Neustadt, L.L.P.

(57) ABSTRACT

An electrolyte material, which comprises a polymer (H) having ion exchange groups converted from precursor groups in a polymer (F) having repeating units (A) having a precursor group represented by the formula (g1) and repeating units (B) based on a perfluoromonomer having a 5-membered ring, and having a density of at most 2.03 g/cm$^3$, the polymer (H) having an ion exchange capacity of from 1.3 to 2.3 meq/g dry resin:

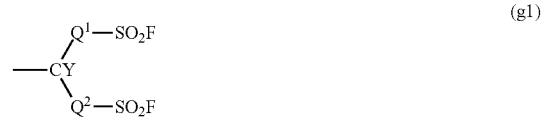

(g1)

wherein Q$^1$ and Q$^2$ are a perfluoroalkylene group having an etheric oxygen atom, or the like, and Y is F or the like; the electrolyte material being suitable for a catalyst layer of the membrane/electrode assembly; the membrane/electrode assembly being excellent in power generation characteristics under low or no humidity conditions and under high humidity conditions.

14 Claims, 1 Drawing Sheet

(56) References Cited

U.S. PATENT DOCUMENTS

2006/0180796 A1* 8/2006 Adachi et al. ............ 252/500
2008/0014490 A1   1/2008 Watakabe et al.
2008/0138685 A1* 6/2008 Kaneko et al. ............ 429/33
2009/0110967 A1   4/2009 Hommura et al.

FOREIGN PATENT DOCUMENTS

| | | |
|---|---|---|
| JP | 2008-243419 | 10/2008 |
| WO | WO 2007/013533 A1 | 2/2007 |
| WO | WO 2008/084701 A1 | 7/2008 |
| WO | WO 2008/090990 A1 | 7/2008 |
| WO | WO 2009/125795 A1 | 10/2009 |

OTHER PUBLICATIONS

U.S. Appl. No. 12/836,105, filed Jul. 14, 2010, Hommura, et al.
International Search Report issued Sep. 28, 2010 in PCT/JP2010/062381.
U.S. Appl. No. 13/563,802, filed Aug. 1, 2012, Watakabe, et al.
U.S. Appl. No. 13/564,969, filed Aug. 2, 2012, Hommura, et al.
Supplementary European Search Report issued Mar. 5, 2013, in European Patent Application No. 10804324.1 filed Jul. 22, 2010.

* cited by examiner

ELECTROLYTE MATERIAL, LIQUID COMPOSITION AND MEMBRANE/ELECTRODE ASSEMBLY FOR POLYMER ELECTROLYTE FUEL CELL

BACKGROUND OF THE INVENTION

1. Field of the Invention

The present invention relates to an electrolyte material for a polymer electrolyte fuel cell, a liquid composition comprising the electrolyte material, and a membrane/electrode assembly for a polymer electrolyte fuel cell containing the electrolyte material in a catalyst layer.

2. Discussion of Background

As an electrolyte material contained in a catalyst layer of a membrane/electrode assembly for a polymer electrolyte fuel cell, the following polymer (1) has been known.

(1) A polymer having sulfonic acid groups ($-SO_3H$ groups) converted from $-SO_2F$ groups in a polymer having repeating units based on a compound represented by the following formula (m3) and repeating units based on tetrafluoroethylene (hereinafter referred to as TFE):

$$CF_2=CF(OCF_2CFZ)_mO_p(CF_2)_nSO_2F \qquad (m3)$$

wherein Z is a fluorine atom or a trifluoromethyl group, m is an integer of from 0 to 3, p is 0 or 1, and n is from 1 to 12, provided that m+p>0.

A polymer electrolyte fuel cell is required to be operated under low humidity conditions where the relative humidity of the reaction gas (fuel gas and oxidant gas) is low, or under no humidity conditions, in order to simplify the fuel cell system or to reduce the cost.

However, the polymer (1) has low proton conductivity, and accordingly a polymer electrolyte fuel cell employing the polymer (1) as an electrolyte material of a catalyst layer has low power generation characteristics (such as output voltage) under low or no humidity conditions.

As an electrolyte material having high proton conductivity, the following polymer (2) has been proposed.

(2) A polymer having sulfonic acid groups ($-SO_3H$ groups) converted from $-SO_2F$ groups in a polymer having repeating units based on a perfluoromonomer having two $-SO_2F$ groups and repeating units based on TFE (Patent Document 1).

However, even a polymer electrolyte fuel cell employing the polymer (2) as an electrolyte material of a catalyst layer still has insufficient power generation characteristics (such as output voltage) under low or no humidity conditions.
PATENT DOCUMENT 1: WO2007/013533

SUMMARY OF THE INVENTION

The present invention provides a membrane/electrode assembly excellent in the power generation characteristics under low or no humidity conditions and under high humidity conditions; an electrolyte material suitable for a catalyst layer of the membrane/electrode assembly; and a liquid composition suitable for formation of a catalyst layer of the membrane/electrode assembly.

The electrolyte material of the present invention comprises a polymer (H) having ion exchange groups converted from precursor groups in the following polymer (F), the polymer (H) having an ion exchange capacity of from 1.3 to 2.3 meq/g dry resin:

polymer (F): a polymer which has repeating units (A) based on a perfluoromonomer having a precursor group represented by the following formula (g1) and repeating units (B) based on a perfluoromonomer having a 5-membered ring or a perfluoromonomer capable of forming a 5-membered ring by cyclic polymerization, and which has a density of at most 2.03 g/cm³:

wherein $Q^1$ is a perfluoroalkylene group which may have an etheric oxygen atom, $Q^2$ is a single bond or a perfluoroalkylene group which may have an etheric oxygen atom, and Y is a fluorine atom or a monovalent perfluoroorganic group.

It is preferred that at least one type of repeating units having ion exchange groups converted from the precursor groups in the repeating units (A) are repeating units represented by the following formula (u1):

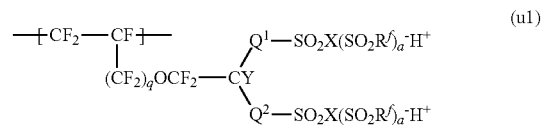

wherein $R^f$ is a perfluoroalkyl group which may have an etheric oxygen atom, X is an oxygen atom, a nitrogen atom or a carbon atom, provided that when X is an oxygen atom, a=0, when X is a nitrogen atom, a=1, and when X is a carbon atom, a=2, and q is 0 or 1.

It is preferred that each of $Q^1$ and $Q^2$ which are independent of each other, is a $C_{1-6}$ perfluoroalkylene group which may have an etheric oxygen atom, and it is more preferred that at least one of $Q^1$ and $Q^2$ is a $C_{1-6}$ perfluoroalkylene group having an etheric oxygen atom.

It is preferred that at least one type of the repeating units (B) are repeating units represented by the following formula (u21):

wherein each of $R^{11}$ and $R^{12}$ which are independent of each other, is a fluorine atom or a $C_{1-5}$ perfluoroalkyl group, and each of $R^{13}$ and $R^{14}$ which are independent of each other, is a fluorine atom, a $C_{1-5}$ perfluoroalkyl group or a $C_{1-5}$ perfluoroalkoxy group.

It is preferred that $R^{13}$ and $R^{14}$ are a fluorine atom.

It is preferred that at least one type of the repeating units represented by the formula (u21) are repeating units represented by the following formula (u21-1):

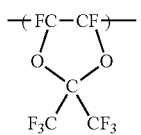
(u21-1)

It is preferred that at least one type of the repeating units (B) are repeating units represented by the following formula (u22):

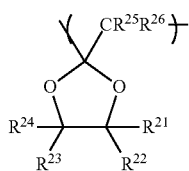
(u22)

wherein each of $R^{21}$ to $R^{26}$ which are independent of one another, is a monovalent perfluoroorganic group which may have an etheric oxygen atom, or a fluorine atom.

It is preferred that at least one type of the repeating units represented by the formula (u22) are repeating units represented by the following formula (u22-1):

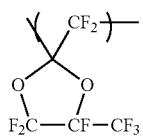
(u22-1)

It is preferred that at least one type of the repeating units (B) are repeating units represented by the following formula (u24):

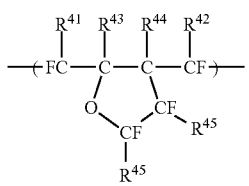
(u24)

wherein each of $R^{41}$ to $R^{46}$ which are independent of one another, is a monovalent perfluoroorganic group which may have an etheric oxygen atom, or a fluorine atom.

It is preferred that at least one type of the repeating units represented by the formula (u24) are repeating units represented by the following formula (u24-1):

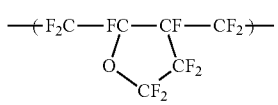
(u24-1)

The polymer (F) may further have repeating units based on TFE.

The liquid composition of the present invention comprises a dispersion medium and the electrolyte material of the present invention dispersed in the dispersion medium, wherein the dispersion medium contains an organic solvent having a hydroxy group.

The membrane/electrode assembly for a polymer electrolyte fuel cell of the present invention comprises an anode having a catalyst layer containing a proton conductive polymer, a cathode having a catalyst layer containing a proton conductive polymer, and a polymer electrolyte membrane disposed between the anode and the cathode, wherein the proton conductive polymer contained in the catalyst layer of at least one of the cathode and the anode is the electrolyte material of the present invention.

The membrane/electrode assembly of the present invention is excellent in the power generation characteristics under low or no humidity conditions and under high humidity conditions.

The electrolyte material of the present invention is suitable for a catalyst layer of a membrane/electrode assembly.

The liquid composition of the present invention is suitable for formation of a catalyst layer of the membrane/electrode assembly of the present invention.

DETAILED DESCRIPTION OF THE PREFERRED EMBODIMENTS

Figure 1:
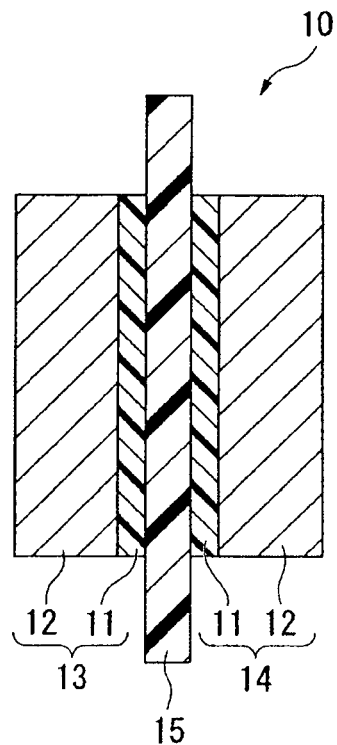
FIG. 1 is a cross section illustrating one example of a membrane/electrode assembly of the present invention.

In the present specification, repeating units represented by the formula (u1) will be referred to as units (u1). The same applies to repeating units represented by other formulae.

Further, in the present specification, a compound represented by the formula (m1) will be referred to as a compound (m1). The same applies to compounds represented by other formulae.

Further, in the present specification, a group represented by the formula (g1) will be referred to as a group (g1). The same applies to groups represented by other formulae.

In the present specification, repeating units mean units derived from a monomer formed by polymerization of the monomer. The repeating units may be units directly formed by the polymerization reaction, or may be units having part of the units converted to another structure by treating the polymer.

Further, a monomer is a compound having a polymerizable carbon-carbon double bond.

Further, an ion exchange group is a group having W, a monovalent metal cation, an ammonium ion or the like. The ion exchange group may, for example, be a sulfonic acid group, a sulfonimide group or a sulfonmethide group.

Further, a precursor group is a group capable of being converted to an ion exchange group by a known treatment such as hydrolysis or treatment for conversion to an acid form. Such a precursor group may, for example, be a —$SO_2F$ group.

<Electrolyte Material>

The electrolyte material of the present invention comprises a polymer (H) having ion exchange groups converted from precursor groups in a polymer (F).

(Polymer (F))

The polymer (F) is a polymer having specific repeating units (A) and specific repeating units (B), and as a case requires, other repeating units (C).

Repeating Units (A):

Repeating units (A) are repeating units based on a perfluoromonomer (hereinafter sometimes referred to as a monomer (a)) having a group (g1) as a precursor group of an ion exchange group.

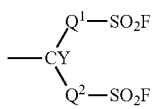
(g1)

$Q^1$ is a perfluoroalkylene group which may have an etheric oxygen atom.

$Q^2$ is a single bond or a perfluoroalkylene group which may have an etheric oxygen atom.

In a case where the perfluoroalkylene group as $Q^1$ or $Q^2$ has an etheric oxygen atom, it may have one or more such oxygen atoms. Further, such an oxygen atom may be inserted between the carbon atom-carbon atom bond of the perfluoroalkylene group, or may be inserted at the terminal of the carbon atom bond.

The perfluoroalkylene group may be linear or branched, and is preferably linear.

The number of carbon atoms in the perfluoroalkene group is preferably from 1 to 6, more preferably from 1 to 4. When the number of carbon atoms is at most 6, the boiling point of the fluoromonomer as a starting material will be low, whereby purification by distillation will be easy. Further, when the number of carbon atoms is at most 6, a decrease in the ion exchange capacity of the polymer (H) will be suppressed, and a decrease in the proton conductivity will be suppressed.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability of power generation performance will be obtained when a polymer electrolyte fuel cell is operated for a long period of time as compared with a case where $Q^2$ is a single bond.

It is preferred that at least one of $Q^1$ and $Q^2$ is a $C_{1-6}$ perfluoroalkylene group having an etheric oxygen atom. A fluoromonomer having a $C_{1-6}$ perfluoroalkylene group having an etheric oxygen atom can be prepared without fluorination reaction by a fluorine gas, and is thereby easily produced with good yield.

Y is a fluorine atom or a monovalent perfluoroorganic group.

Y is preferably a fluorine atom or a $C_{1-6}$ linear perfluoroalkyl group which may have an etheric oxygen atom.

The monomer (a) is preferably a compound (m1), since the polymer has a low water content even when it has a high electrical conductivity, and accordingly higher power generation performance will be obtained under low or no humidity conditions and under high humidity conditions.

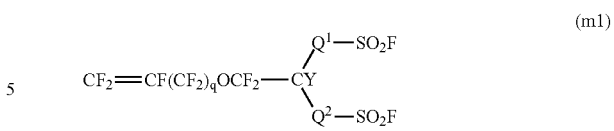
(m1)

$Q^1$, $Q^2$ and Y are as defined for the group (g1).

q is 0 or 1.

The compound (m1) is preferably compounds (m1-1) to (m1-3), particularly preferably the compound (m1-1), whereby production of the polymer (H) will be easy, and industrial application is easy.

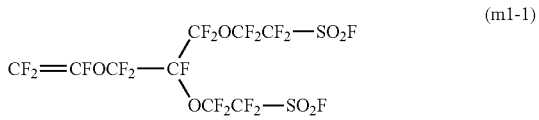
(m1-1)

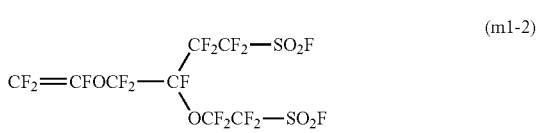
(m1-2)

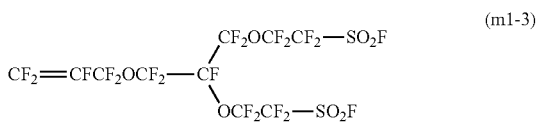
(m1-3)

The compound (m1) can be prepared by a method disclosed in WO2007/013533, JP-A-2008-202039, etc.

Repeating Units (B):

Repeating units (B) are repeating units based on a perfluoromonomer (hereinafter sometimes referred to as a monomer (b1)) having a 5-membered ring or a perfluoromonomer (hereinafter sometimes referred to as a monomer (b2)) capable of forming a 5-membered ring by cyclic polymerization (hereinafter the monomer (b1) and the monomer (b2) will sometimes generically be referred to as a monomer (b)).

A 5-membered ring is a cyclic perfluoroorganic group which may have one or two etheric oxygen atoms.

A polymerizable carbon-carbon double bond in the monomer (b1) may be constituted by two adjacent carbon atoms constituting the 5-membered ring, may be constituted by one carbon atom constituting the 5-membered ring and one carbon atom adjacent thereto, present outside the 5-membered ring, or may be constituted by two adjacent carbon atoms present outside the 5-membered ring. The polymerizable carbon-carbon double bond constituted by two adjacent carbon atoms present outside the 5-membered ring may be bonded to the 5-membered ring by means of a bivalent perfluoroorganic group which may have an etheric oxygen atom (e.g. a perfluoroalkylene group which may have an etheric oxygen atom).

The monomer (b1) may, for example, be compounds (m21) to (m23), and is preferably the compound (m21) or the compound (m22) in view of a high effect of further improving the electrode performance of the polymer.

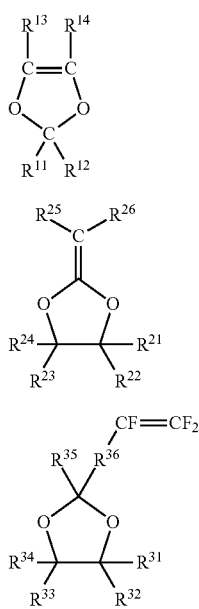

(m21)

(m22)

(m23)

Each of $R^{11}$ and $R^{12}$ which are independent of each other, is a fluorine atom or a $C_{1-5}$ perfluoroalkyl group.

Each of $R^{13}$ and $R^{14}$ which are independent of each other, is a fluorine atom, a $C_{1-5}$ perfluoroalkyl group or a $C_{1-5}$ perfluoroalkoxy group. It is preferred that at least one of $R^{13}$ and $R^{14}$ is a fluorine atom, and it is more preferred that both are a fluorine atom, in view of high polymerizability.

Each of the perfluoroalkyl group and the perfluoroalkoxy group may be linear or branched, and is preferably linear.

Each of $R^{21}$ to $R^{26}$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear.

It is preferred that at least one of $R^{25}$ and $R^{26}$ is a fluorine atom, and it is more preferred that both of them are a fluorine atom, in view of high polymerizability.

$R^{31}$ to $R^{35}$ are a fluorine atom, a $C_{1-6}$ perfluoroalkyl group, or a $C_{2-6}$ perfluoroalkyl group having an etheric oxygen atom between the carbon-carbon bond. In a case where the perfluoroalkyl group has an etheric oxygen atom, it may have one or more such oxygen atoms. The perfluoroalkyl group may be linear or branched, and is preferably linear.

$R^{36}$ is a single bond, a $C_{1-6}$ perfluoroalkylene group or a $C_{2-6}$ perfluoroalkylene group having an etheric oxygen atom between the carbon-carbon bond. In a case where the perfluoroalkylene group has an etheric oxygen atom, it may have one or more such oxygen atoms. The perfluoroalkylene group may be linear or branched and is preferably linear.

The compound (m21) may, for example, be compounds (m21-1) to (m21-8), and is particularly preferably the compound (m21-1) in view of a high effect of further improving the electrode performance of the polymer.

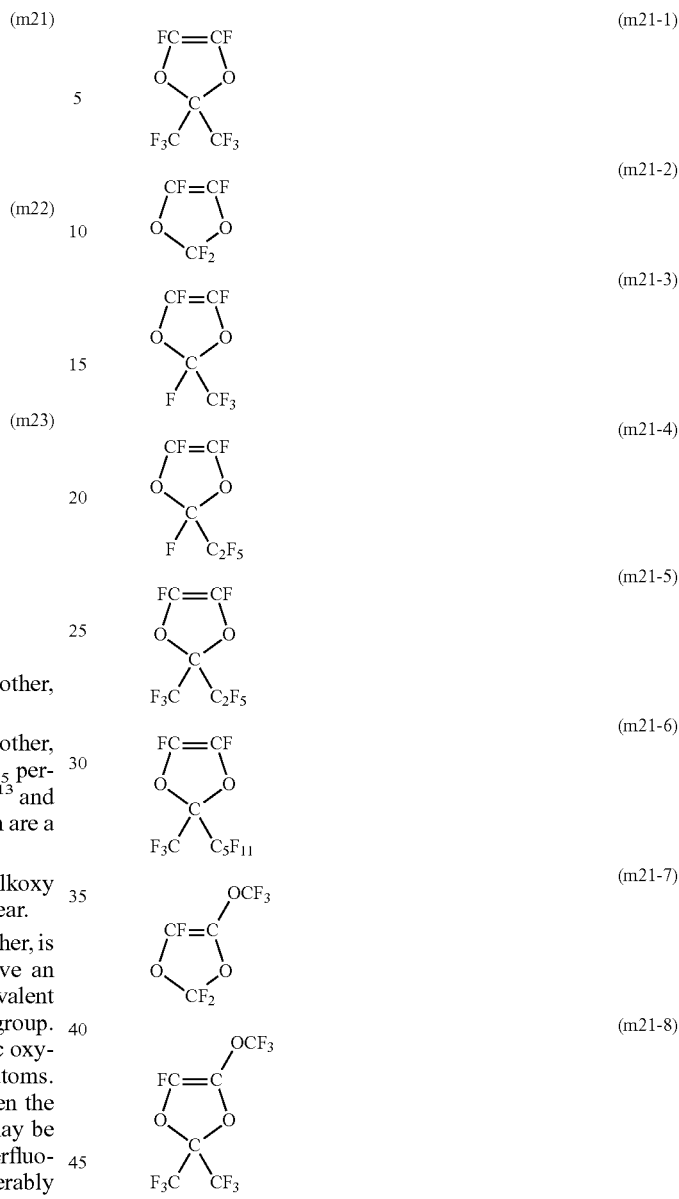

The compound (m22) may, for example, be a compound (m22-1) or a compound (m22-2), and is particularly preferably the compound (m22-1) in view of easiness of preparation and high polymerizability.

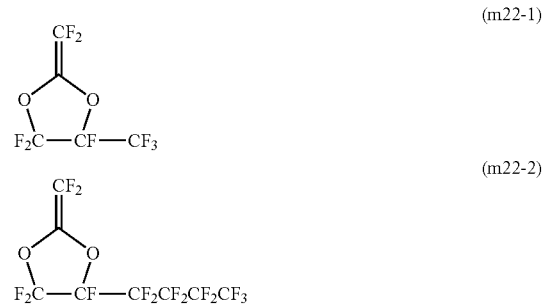

The compound (m23) may, for example, be a compound (m23-1) or a compound (m23-2).

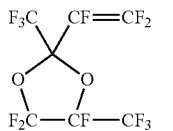
(m23-1)

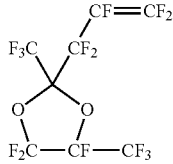
(m23-2)

The compound (m21) can be prepared by a method disclosed in Macromolecule, vol. 26, number 22, 1993, p. 5829 to 5834, JP-A-6-92957, etc.

The compound (m22) can be prepared by a method disclosed in WO2000/056694, Izvestiya Akademii Nauk SSSR, Seriya Khimicheskaya, 1989, vol. 4, p. 938 to 942, etc.

The compound (m23) can be prepared by a method disclosed in JP-A-2006-241302, etc.

The monomer (b2) may, for example, be a compound (m24).

$$CF(R^{41})=C(R^{43})-O-CF(R^{46})-CF(R^{46})-C(R^{44})=CF(R^{42})$$ (m24)

Each of $R^{41}$ to $R^{46}$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear.

$R^{41}$ to $R^{44}$ are more preferably a fluorine atom in view of high polymerizability.

The compound (m24) may, for example, be compounds (m24-1) to (m24-3), and is particularly preferably the compound (m24-1) in view of easiness of preparation of the monomer.

$$CF_2=CF-O-CF_2-CF_2-CF=CF_2$$ (m24-1)

$$CF_2=CF-O-CF_2-CF(CF_3)-CF=CF_2$$ (m24-2)

$$CF_2=CF-O-CF(CF_3)-CF_2-CF=CF_2$$ (m24-3)

The compound (m24) can be prepared by a method disclosed in Macromol. Symp., vol. 98, 1995, p. 753 to 767, etc.

Further, as the monomer (b1), a perfluoromonomer (hereinafter sometimes referred to as a monomer (b1")) having at least two polymerizable carbon-carbon double bonds and having a 5-membered ring may also be used. By use of the monomer (b1"), the molecular weight of the polymer (F) can be increased.

The monomer (b1") may, for example, be a compound (m25).

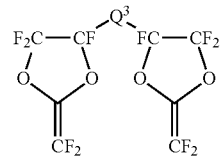
(m25)

$Q^3$ is a single bond, an oxygen atom or a $C_{1-10}$ perfluoroalkylene group which may have an etheric oxygen atom.

The compound (m25) is preferably compounds (m25-1) to (m25-6) in view of easiness of preparation and high polymerizability.

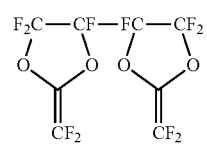
(m25-1)

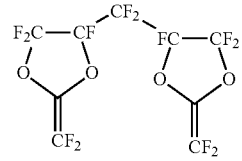
(m25-2)

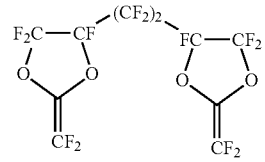
(m25-3)

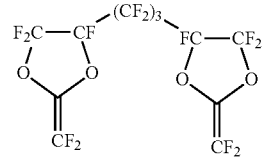
(m25-4)

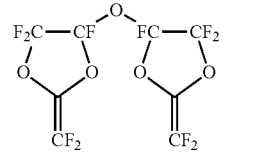
(m25-5)

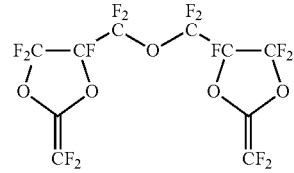
(m25-6)

The amount of addition of the monomer (b1") is preferably from 0.001 to 20 mol % based on 100 mol % of all monomers (the total of the monomer (a), the monomer (b) and the monomer (c)) constituting the polymer (F). If it is less than 0.001 mol %, no sufficient effect of increasing the molecular weight will be obtained, and if it is larger than 20 mol %, production of the polymer (F) will be difficult due to the difference of the reactivity with the monomer (a) and the monomer (b).

Other Repeating Units (C):

Other repeating units (C) are repeating units based on a monomer (hereinafter sometimes referred to as a monomer (c)) other than the monomer (a) and the monomer (b).

The monomer (c) may, for example, be TFE, chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene) or a perfluoro(alkyl vinyl ether). The monomer (c) is particularly preferably TFE. TFE, which has high crystallinity, has an effect of suppressing swelling when the polymer (H) contains water, and can reduce the water content of the polymer (H).

Further, as the monomer (c), a perfluoromonomer (hereinafter sometimes referred to as a monomer (c")) having two or more polymerizable carbon-carbon double bonds may also be used. By use of the monomer (c"), the molecular weight of the polymer (F) can be increased.

The monomer (c") may, for example, be a compound (m4) (excluding the compound (m24)).

$$CF_2=CF-Q^4-CF=CF_2 \quad (m4)$$

wherein $Q^4$ is an oxygen atom or a linear or branched perfluoroalkylene group which may have an etheric oxygen atom.

The compound (m4) is preferably compounds (m4-1) to (m4-3) in view of easiness of preparation.

$$CF_2=CFOCF=CF_2 \quad (m4-1)$$

$$CF_2=CFO(CF_2)_hOCF=CF_2 \quad (m4-2)$$

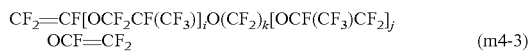

$$CF_2=CF[OCF_2CF(CF_3)]_iO(CF_2)_k[OCF(CF_3)CF_2]_j\\OCF=CF_2 \quad (m4-3)$$

wherein each of h and k is an integer of from 2 to 8, and each of i and j which are independent of each other, is an integer of from 0 to 5, provided that i+j≥1.

The amount of addition of the monomer (c") is preferably from 0.001 to 20 mol % based on 100 mol % of all the monomers (the total of the monomer (a), the monomer (b) and the monomer (c)) constituting the polymer (F). If it is less than 0.001 mol %, no sufficient effect of increasing the molecular weight will be obtained, and if it is larger than 20 mol %, production of the polymer (F) will be difficult due to the difference of the reactivity with the monomer (a) and the monomer (b).

Density:

The density of the polymer (F) is at most 2.03 g/cm³, preferably from 1.80 to 2.00 g/cm³, more preferably from 1.85 to 1.97 g/cm³. When the density is at least 2.03 g/cm³, a membrane/electrode assembly to be obtained will be excellent in the power generation characteristics under low or no humidity conditions.

A method of adjusting the density of the polymer (F) to at most 2.03 g/cm³, may, for example, be a method of increasing the proportion of the repeating units (B) in the polymer (F).

The density of the polymer (F) is a value of the specific gravity obtained by method of replacement in water. By the method of replacement in water, the mass of the polymer (F) is measured in the air, and then the polymer (F) is sunk in water at 20° C. and its mass is measured to calculated the specific gravity at 20° C., and further, utilizing that the density of water at 4° C. is 0.999973 g/cm³, the specific gravity in water at 20° C. is calculated to the specific gravity in water at 4° C. The specific gravity in water at 4° C. obtained by the method of replacement in water is synonymous with the density within a range of the significant figures (significant figures: double figures) of the density in the present invention, and accordingly the value of the specific gravity obtained by the method of replacement in water is defined as the density in the present invention.

Production of Polymer (F):

The polymer (F) is produced by polymerizing the monomer (a) and the monomer (b) and as the case requires, the monomer (c).

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical initiator.

The polymerization temperature is usually from 10 to 150° C.

The radical initiator may, for example, be a bis(fluoroacyl) peroxide, a bis(chlorofluoroacyl) peroxide, a dialkyl peroxy dicarbonate, a diacyl peroxide, a peroxy ester, an azo compound or a persulfate, and a perfluoro compound such as a bis(fluoroacyl) peroxide is preferred from such a viewpoint that the polymer (F) substantially free from unstable terminal groups is thereby obtainable.

A solvent to be used for the solution polymerization method is preferably a solvent having a boiling point of from 20 to 350° C., more preferably a solvent having a boiling point of from 40 to 150° C. Such a solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1H-perfluorohexane), a hydrochlorofluorocarbon (such as 3,3-dichloro-1,1,1,2,2-pentafluoropropane or 1,3-dichloro-1,1,2,2,3-pentafluoropropane) or a hydrofluoroether (such as $CF_3CH_2OCF_2CF_2H$).

In the solution polymerization method, monomers, a radical initiator, etc. are added to a solvent, and radicals are formed in the solvent to carry out polymerization of the monomers. The addition of the monomers and the initiator may be all at once, sequentially or continuously.

In the suspension polymerization method, water is used as a dispersion medium, and in the dispersion medium, monomers, a non-ionic radical initiator, etc. are added to let radicals form in the dispersion medium thereby to carry out polymerization of the monomers.

The non-ionic radical initiator may, for example, be a bis (fluoroacyl) peroxide, a bis(chlorofluoroacyl) peroxide, a dialkylperoxy dicarbonate, a diacyl peroxide, a peroxy ester, a dialkyl peroxide, a bis(fluoroalkyl) peroxide or an azo compound.

To the dispersion medium, the above-mentioned solvent; a surfactant as a dispersion stabilizer to prevent agglomeration of suspended particles; a hydrocarbon compound (such as hexane or methanol) as a molecular-weight controlling agent, etc., may be added as assisting agents.

(Polymer (H))

The polymer (H) is a polymer having ion exchange groups converted from precursor groups in the polymer (F), and is a polymer having specific repeating units (A') and specific repeating units (B) and as the case requires, other repeating units (C).

Repeating Units (A'):

Repeating units (A') are repeating units having ion exchange groups converted from the precursor groups in the repeating units (A).

The ion exchange group is preferably a group (g'1).

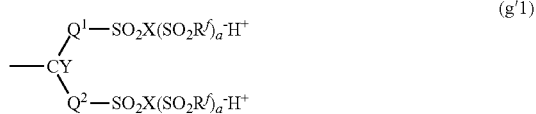
(g'1)

$Q^1$, $Q^2$ and Y are as defined for the group (g1).

$R^f$ is a linear or branched perfluoroalkyl group which may have an etheric oxygen atom. The number of carbon atoms in the perfluoroalkyl group is preferably from 1 to 8, more preferably from 1 to 6. In a case where the group (g'1) has two or more $R^f$s, the respective $R^f$s may be the same groups or different groups.

X is an oxygen atom, a nitrogen atom or a carbon atom, provided that when X is an oxygen atom, a=0, when X is a nitrogen atom, a=1, and when X is a carbon atom, a=2.

The group (g'1) may, for example, be a sulfonic acid group ($—SO_3^-H^+$ group), a sulfonimide group ($—SO_2N(SO_2R^f)^-H^+$ group) or a sulfonmethide group ($—SO_2C(SO_2R^f)_2^-H^+$ group).

The repeating units (A') are preferably units (u1), since the water content can be suppressed low even when the polymer has an increased electrical conductivity, and accordingly higher power generation performance can be obtained under low or no humidity conditions and under high humidity conditions.

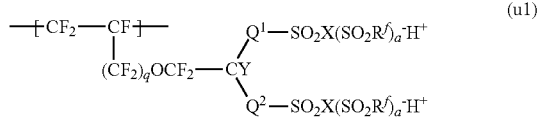
(u1)

$Q^1$, $Q^2$ and Y are as defined for the group (g1).
q is as defined for the compound (m1).
$R^f$, X and "a" are as defined for the group (g'1).

The units (u1) are preferably units (u1-1) to (u1-3), particularly preferably the units (u1-1), in view of easiness of production of the polymer (H) and easiness of industrial application.

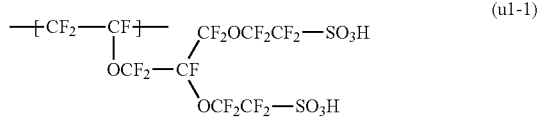
(u1-1)

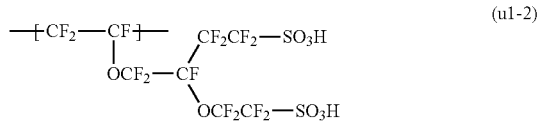
(u1-2)

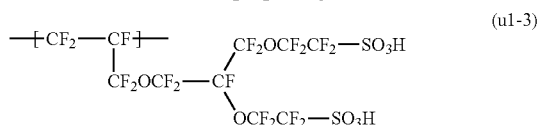
(u1-3)

Repeating Units (B):

The repeating units (B) are repeating units based on a monomer (b1) or a monomer (b2).

The repeating units based on the monomer (b1) may, for example, be units (u21) to (u23), and preferably the units (u21) or the units (u22) in view of a high effect of further improving the electrode performance of the polymer.

(u21)

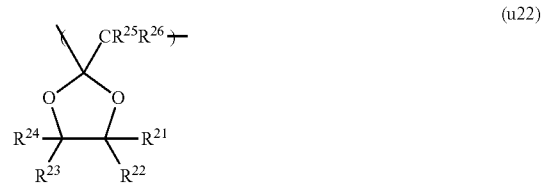
(u22)

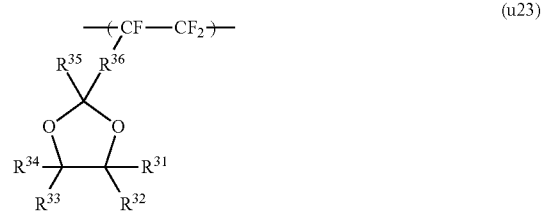
(u23)

$R^{11}$ to $R^{14}$ are as defined for the compound (m21). It is preferred that at least one of $R^{13}$ and $R^{14}$ is a fluorine atom, and it is more preferred that both of them are a fluorine atom, in view of high polymerizability.

$R^{21}$ to $R^{26}$ are as defined for the compound (m22).

$R^{31}$ to $R^{36}$ are as defined for the compound (m23).

The units (u21) are particularly preferably units (u21-1) in view of a high effect of further improving the electrode performance of the polymer.

The units (u22) are particularly preferably units (u22-1) in view of easiness of preparation of the monomer.

(u21-1)

(u22-1)

The repeating units based on the monomer (b2) may, for example, be units (u24). $R^{41}$ to $R^{46}$ are as defined for the compound (m24).

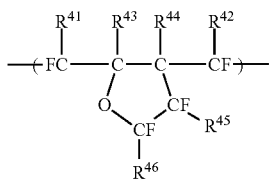

(u24)

The units (u24) are particularly preferably units (u24-1) in view of easiness of preparation of the monomer.

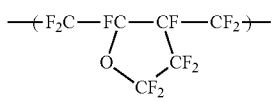

(u24-1)

Other Repeating Units (C):

Other repeating units (C) are repeating units based on the monomer (c).

Other repeating units (C) are particularly preferably repeating units based on TFE with a view to decreasing the water content of the polymer (H).

Ion Exchange Capacity:

The ion exchange capacity of the polymer (H) is from 1.3 to 2.3 meq/g dry resin, preferably from 1.4 to 2.0 meq/g dry resin. When the ion exchange capacity is at least 1.3 meq/g dry resin, the polymer (H) has high electrical conductivity and accordingly when it is used as an electrolyte material of a catalyst layer of a polymer electrolyte fuel cell, sufficient cell output will be obtained. When the ion exchange capacity is at most 2.3 meq/g dry resin, preparation of the polymer (F) having a low density will be easy.

In order that the polymer (H) may have an ion exchange capacity of at least 1.3 meq/g dry resin, the proportion of the monomer (a) when the polymer (F) is prepared is adjusted. Specifically, it is important to control the monomer composition at the time of the polymerization, and for that purpose, it is necessary to determine the charge composition considering the polymerizabilities of monomers. Further, when two or more types of monomers are reacted, it is possible to let the reaction proceed at a constant composition by successively or continuously adding a monomer having a higher reactivity.

Production of Polymer (H):

The polymer (H) is produced by converting the precursor groups in the polymer (F) to ion exchange groups.

As a method of converting —$SO_2F$ groups to sulfonic acid groups (—$SO_3^-H^+$ groups), the following method (i) may be mentioned, and as a method of converting —$SO_2F$ groups to sulfonimide groups (—$SO_2N(SO_2R^f)^-H^+$ groups), the following method (ii) may be mentioned.

(i) A method of hydrolyzing —$SO_2F$ groups in the polymer (F) to a sulfonic acid salt and then converting the sulfonic acid salt to acid-form to obtain sulfonic acid groups.

(ii) A method of imidizing —$SO_2F$ groups in the polymer (F) to salt-form sulfonimide groups, followed by conversion to acid-form to form acid-form sulfonimide groups.

Method (i):

The hydrolysis is carried out, for example, by contacting the polymer (F) with a basic compound in a solvent. The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to acid-form may be carried out, for example, by contacting the polymer having a sulfonic acid salt with an aqueous solution of hydrochloric acid, sulfuric acid or the like.

The hydrolysis and conversion to acid-form are carried out usually at a temperature of from 0 to 120° C.

Method (ii):

As the imidation, the following methods may, for example, be mentioned.

(ii-1) A method of reacting —$SO_2F$ groups with $R^fSO_2NHM$.

(ii-2) A method of reacting —$SO_2F$ groups with $R^fSO_2NH_2$ in the presence of an alkali metal hydroxide, an alkali metal carbonate, MF, ammonia or a primary to tertiary amine.

(ii-3) A method of reacting —$SO_2F$ groups with $R^fSO_2NMSi(CH_3)_3$.

Here, M is an alkali metal or a primary to quaternary ammonium.

The conversion to acid-form is carried out by treating the polymer having salt-form sulfonimide groups with an acid (such as sulfuric acid, nitric acid or hydrochloric acid).

Further, the polymer (H) wherein ion exchange groups are sulfonimide groups may also be produced by polymerizing a monomer (a') having a sulfonimide group converted from a —$SO_2F$ group in the monomer (a), and the monomer (b), and as the case requires, the monomer (c).

The monomer (a') may be produced by adding chlorine or bromine to the carbon-carbon double bond in the monomer (a), and converting a —$SO_2F$ group to a sulfonimide group by the method (ii), followed by a dechlorination or debromination reaction by means of metallic zinc.

The above-described electrolyte material of the present invention comprises a polymer (H) having ion exchange groups converted from precursor groups in a polymer (F) having specific repeating units (A) and specific repeating units (B) and having a density of at most 2.03 g/cm$^3$, the polymer (H) having an ion exchange capacity of from 1.3 to 2.3 meq/dry resin, and accordingly a membrane/electrode assembly having a catalyst layer containing the electrolyte material can exhibit sufficient power generation characteristics (such as output voltage) under low or no humidity conditions and under high humidity conditions. Particularly, under severe conditions such as under high temperature and low or no humidity conditions (cell temperature: at least 90° C., humidity: at most 30% RH), high power generation characteristics (such as output voltage) can be exhibited.

<Liquid Composition>

The liquid composition of the present invention is a composition comprising a dispersion medium and the electrolyte material of the present invention dispersed in the dispersion medium.

The dispersion medium contains an organic solvent having a hydroxy group.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol, 3,3,4,4,5,5,6,6,7,7,8,8,8-tridecafluoro-1-octanol.

The organic solvents having a hydroxy group may be used alone or as a mixture of two or more of them.

The dispersion medium preferably contains water.

The proportion of water is preferably from 10 to 99 mass %, more preferably from 40 to 99 mass % in the dispersion medium (100 mass %). Dispersibility of the electrolyte material in the dispersion medium can be improved by increasing the proportion of water.

The proportion of the organic solvent having a hydroxy group is preferably from 1 to 90 mass %, more preferably from 1 to 60 mass % in the dispersion medium (100 mass %).

The proportion of the electrolyte material is preferably from 1 to 50 mass %, more preferably from 3 to 30 mass % in the liquid composition (100 mass %).

With respect to a method of preparing the liquid composition, several reports have been made, and for example, the liquid composition can be prepared in accordance with a preparation method disclosed in JP-B-4-35226, JP-A-2001-504872, JP-A-2005-82749, WO2006/38928, JP-A-2004-519296, etc.

A specific method of preparing the liquid composition may be a method of applying shearing such as stirring to the electrolyte material in the dispersion medium under atmospheric pressure or in a state where it is sealed in an autoclave or the like. The preparation temperature is preferably from 0 to 250° C., more preferably from 20 to 150° C. As the case requires, shearing such as ultrasonic waves may be applied.

Further, in a case where shearing such as stirring is applied to a mixed liquid having the electrolyte material, an organic solvent and water mixed to obtain a liquid composition, shearing such as stirring may be applied to a mixed liquid obtained by adding an organic solvent and water all at once to the electrolyte material, or the organic solvent and water may be dividedly added to the electrolyte material several times, and shearing such as stirring is applied at intervals between the additions. For example, shearing such as stirring is applied to a mixed liquid having part of the organic solvent and part of water added to the electrolyte material, and then the rest of the organic solvent and water is added to the mixed liquid, and shearing such as stirring is applied again. Otherwise, only the organic solvent is added to the electrolyte material, and shearing such as stirring is added, and then only water is added, and shearing such as stirring is applied again.

The liquid composition of the present invention is suitably used for formation of a catalyst layer of a membrane/electrode assembly as described hereinafter.

<Membrane/Electrode Assembly>

FIG. 1 is a cross section illustrating one example of a membrane/electrode assembly (hereinafter referred to as a membrane/electrode assembly) for a polymer electrolyte fuel cell of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and a proton conductive polymer.

The catalyst may be a supported catalyst having platinum or a platinum alloy supported on a carbon carrier.

The carbon carrier may, for example, be a carbon black powder.

The proton conductive polymer may be the electrolyte material of the present invention or a known electrolyte material. The proton conductive polymer contained in the catalyst layer of at least one of the cathode and the anode is the electrolyte material of the present invention, and it is preferred that the proton conductive polymer contained in the catalyst layer of the cathode is the electrolyte material of the present invention.

The catalyst layer 11 may contain a water-repellent agent with a view to increasing the effect to suppress flooding. The water-repellent agent may, for example, be a tetrafluoroethylene/hexafluoropropylene copolymer, a tetrafluoroethylene/perfluoro(alkyl vinyl ether) copolymer or polytetrafluoroethylene. The water-repellent agent is preferably a fluoropolymer soluble in a solvent, from such a viewpoint that the water repellent treatment of the catalyst layer 11 is easy. The amount of the water-repellent agent is preferably from 0.01 to 30 mass % in the catalyst layer (100 mass %).

As a method of forming the catalyst layer 11, the following methods may be mentioned.

(i) A method of applying a fluid for forming a catalyst layer on the polymer electrolyte membrane 15, the gas diffusion layer 12 or a carbon layer 16, followed by drying.

(ii) A method of applying a fluid for forming a catalyst layer on a substrate film, followed by drying to form a catalyst layer 11, and transferring the catalyst layer 11 to the polymer electrolyte membrane 15.

The fluid for forming a catalyst layer is a fluid comprising the electrolyte material and the catalyst dispersed in a dispersion medium. The fluid for forming a catalyst layer may be prepared, for example, by mixing the liquid composition of the present invention with a dispersion of the catalyst.

(Gas Diffusion Layer)

The gas diffusion layer 12 has a function to uniformly diffuse a gas into the catalyst layer 11 and a function as a current collector.

The gas diffusion layer 12 may, for example, be carbon paper, carbon cloth or carbon felt.

The gas diffusion layer 12 is preferably subjected to water repellent treatment e.g. by polytetrafluoroethylene.

(Carbon Layer)

Figure 2:
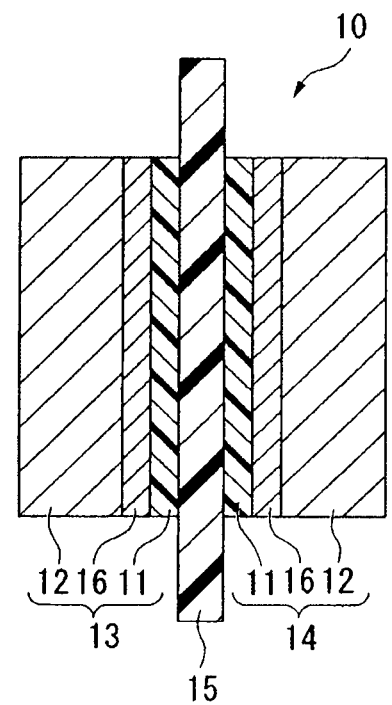
FIG. 2 is a cross section illustrating another example of a membrane/electrode assembly of the present invention.

The membrane/electrode assembly 10 may have a carbon layer 16 between the catalyst layer 11 and the gas diffusion layer 12 as shown in FIG. 2. By disposing the carbon layer 16, the gas diffusion properties on the surface of the catalyst layer 11 will be improved, and the power generation performance of a polymer electrolyte fuel cell will be remarkably improved.

The carbon layer 16 is a layer containing carbon and a nonionic fluoropolymer.

The carbon is preferably carbon nanofibers having a fiber diameter of from 1 to 1,000 nm and a carbon length of at most 1,000 μm.

The nonionic fluoropolymer may, for example, be polytetrafluoroethylene.

(Polymer Electrolyte Membrane)

The polymer electrolyte membrane 15 is a membrane containing a proton conductive polymer.

The proton conductive polymer may be the electrolyte material of the present invention or a known electrolyte material. The known electrolyte material may, for example, be a polymer having sulfonic acid groups converted from —SO$_2$F groups in a polymer having repeating units based on a compound (m3) and repeating units based on TFE; or a polymer having sulfonic acid groups converted from —SO$_2$F groups in a polymer having repeating units based on the compound (m1) and repeating units based on TFE.

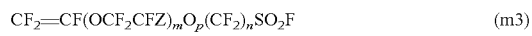
$$CF_2=CF(OCF_2CFZ)_mO_p(CF_2)_nSO_2F \qquad (m3)$$

wherein Z is a fluorine atom or a trifluoromethyl group, m is an integer of from 0 to 3, p is 0 or 1, and n is from 1 to 12, provided that m+p>0.

The polymer electrolyte membrane 15 can be formed, for example, by a method (a casting method) wherein a liquid composition of the electrolyte material is applied on a substrate film or the catalyst layer 11, followed by drying.

The liquid composition is a dispersion having the electrolyte material dispersed in a dispersion medium containing an organic solvent having a hydroxy group and water.

In order to stabilize the polymer electrolyte membrane 15, it is preferred to carry out heat treatment. The temperature for the heat treatment is preferably from 130 to 200° C. depending on the type of the electrolyte material. When the temperature for the heat treatment is at least 130° C., the electrolyte material will not excessively contain water. When the temperature for the heat treatment is at most 200° C., heat decomposition of ion exchange groups may be suppressed, and a decrease in the proton conductivity of the polymer electrolyte membrane 15 may be suppressed.

The polymer electrolyte membrane 15 may be treated with an aqueous hydrogen peroxide solution as the case requires.

The polymer electrolyte membrane 15 may be reinforced by a reinforcing material. The reinforcing material may, for example, be a porous body, fibers, woven fabric or nonwoven fabric. The material of the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and if it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

(Process for Producing Membrane/Electrode Assembly)

The membrane/electrode assembly 10 is produced, for example, by the following method.

(i) A method of forming catalyst layers 11 on a polymer electrolyte membrane 15 to form a membrane/catalyst layer assembly, and sandwiching such a membrane/catalyst layer assembly between gas diffusion layers 12.

(ii) A method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, the membrane/electrode assembly 10 is produced, for example, by the following method.

(i) A method of applying a dispersion containing carbon and a nonionic fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12.

(ii) A method of applying a dispersion containing carbon and a nonionic fluoropolymer on a gas diffusion layer 12, followed by drying to form a carbon layer 16, and sandwiching a membrane/catalyst layer assembly having catalyst layers 11 formed on a polymer electrolyte membrane 15 between the gas diffusion layers 12 each having the carbon layer 16.

The above-described membrane/electrode assembly 10 is excellent in the power generation characteristics under low or no humidity conditions and under high humidity conditions since the catalyst layer 11 contains the electrolyte material of the present invention. Particularly, it is excellent in the power generation characteristics under severe conditions such as under high temperature and low or no humidity conditions.

<Polymer Electrolyte Fuel Cell>

The membrane/electrode assembly of the present invention is used for a polymer electrolyte fuel cell. A polymer electrolyte fuel cell is produced, for example, by sandwiching a membrane/electrode assembly between two separators to form a cell, and stacking a plurality of such cells.

As a separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or a direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples. However, it should be understood that the present invention is by no means restricted to such specific Examples. Examples 1 to 8 and 16 to 23 are Examples of the present invention, and Examples 9 to 15 and 24 to 30 are Comparative Examples.

(Ion Exchange Capacity)

The ion exchange capacity of the polymer (H) was obtained by the following method.

The polymer (H) was put in a glove box and left to stand in an atmosphere into which dry nitrogen was blown for 24 hours or longer and dried. The dry mass of the polymer (H) was measured in the glove box.

The polymer (H) was immersed in a 2 mol/L sodium chloride aqueous solution and left to stand at 60° C. for one hour and then cooled to room temperature. The sodium chloride aqueous solution into which the polymer (H) had been immersed was titrated with a 0.5 mol/L sodium hydroxide aqueous solution to obtain the ion exchange capacity of the polymer (H).

(Density)

The density of the polymer (F) was obtained by using an electronic densimeter (manufactured by Alfa Mirage Co., Ltd., MD-300S) utilizing the method of replacement in water. Specifically, the mass of the polymer (F) was measured in the air, and then the polymer (F) was sunk in water at 20° C. and the mass was measured. The specific gravity in water at 20° C. was obtained from these masses, which was calculated to the specific gravity in water at 4° C. to obtain the density.

(Compound (m1))

Preparation of Compound (m1-1):

Compound (m1-1) was prepared in accordance with the method disclosed in Example 1 of JP-A-2008-202039.

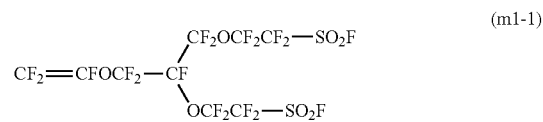

(Compound (m2))
Compound (m21-1):

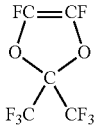
(m21-1)

Compound (m22-1):

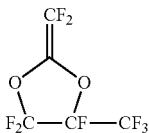
(m22-1)

Compound (m24-1):

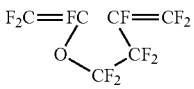
(m24-1)

(Compound (m3))
Compound (m3-1):

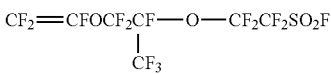
(m3-1)

(Radical Initiator):
Compound (i-1):

(i-1)

Compound (i-2):

(i-2)

(Solvent)
Compound (s-1):

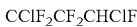
(s-1)

Compound (s-2):

(s-2)

Example 1

Into a stainless steel autoclave having an internal capacity of 125 mL, 9.15 g of compound (m21-1), 45.65 g of compound (m1-1) and 6.4 mg of compound (i-2) were charged, followed by sufficient deaeration under cooling with liquid nitrogen. Then, the temperature was raised to 40° C. and held for 24.5 hours, and then the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-1). The yield was 4.5 g. The density of polymer (F-1) was measured. The results are shown in Table 1.

Polymer (F-1) was immersed in an aqueous solution containing 20 mass % of methanol and 15 mass % of potassium hydroxide at 50° C. for 40 hours to hydrolyze and convert —SO$_2$F groups in polymer (F-1) to —SO$_3$K groups. Then, the polymer was immersed in a 3 mol/L hydrochloric acid aqueous solution at room temperature for 2 hours. The hydrochloric acid aqueous solution was changed, and the same treatment was further carried out four times to obtain polymer (H-1) having sulfonic acid groups converted from —SO$_3$K groups in the polymer. Polymer (H-1) was sufficiently washed with ultrapure water. The ion exchange capacity of polymer (H-1) was measured. The results are shown in Table 1.

To polymer (H-1), a mixed solvent of ethanol and water (ethanol/water=60/40 mass ratio) was added to adjust the solid content concentration to 15 mass %, followed by stirring using an autoclave at 105° C. for 8 hours to obtain liquid composition (D-1) having polymer (H-1) dispersed in the dispersion medium.

Example 2

Into a stainless steel autoclave having an internal capacity of 125 ml, 9.01 g of compound (m21-1), 50.01 g of compound (m1-1) and 5.6 mg of compound (i-2) were charged, followed by sufficient deaeration under cooling with liquid nitrogen. Then, the temperature was raised to 40° C., followed by stirring for 24 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-2). The yield was 5.7 g. The density of polymer (F-2) was measured. The results are shown in Table 1.

Using polymer (F-2), polymer (H-2) and liquid composition (D-2) were obtained in the same manner as in Example 1. The ion exchange capacity of polymer (H-2) was measured. The results are shown in Table 1.

Example 3

Into a stainless steel autoclave having an internal capacity of 125 ml, 9.0 g of compound (m21-1), 69.27 g of compound (m1-1) and 10.0 mg of compound (i-2) are charged, followed by sufficient deaeration under cooling with liquid nitrogen. Then, the temperature is raised to 40° C., followed by stirring for 26 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-3). The yield is 8.0 g. The density of polymer (F-3) is measured. The results are shown in Table 1.

Using polymer (F-3), polymer (H-3) and liquid composition (D-3) are obtained in the same manner as in Example 1. The ion exchange capacity of polymer (H-3) is measured. The results are shown in Table 1.

Example 4

Into a stainless steel autoclave having an internal capacity of 125 ml, 7.32 g of compound (m21-1), 71.4 g of compound (m1-1) and 10 mg of compound (i-2) are charged, followed by sufficient deaeration under cooling with liquid nitrogen. Then, the temperature is raised to 40° C., followed by stirring for 22 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-4). The yield is 9.0 g. The density of polymer (F-4) is measured. The results are shown in Table 1.

Using polymer (F-4), polymer (H-4) and liquid composition (D-4) are obtained in the same manner as in Example 1. The ion exchange capacity of polymer (H-4) is measured. The results are shown in Table 1.

Example 5

Into a stainless steel autoclave having an internal capacity of 125 ml, 5.86 g of compound (m21-1), 75.1 g of compound (m1-1) and 15 mg of compound (i-2) are charged, followed by sufficient deaeration under cooling with liquid nitrogen. Then, the temperature is raised to 40° C., followed by stirring for 24 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-5). The yield is 6.5 g. The density of polymer (F-5) is measured. The results are shown in Table 1.

Using polymer (F-5), polymer (H-5) and liquid composition (D-5) are obtained in the same manner as in Example 1. The ion exchange capacity of polymer (H-5) is measured. The results are shown in Table 1.

Example 6

Into a stainless steel autoclave having an internal capacity of 125 ml, 3.5 g of compound (m22-1), 76.33 g of compound (m1-1) and 8.5 mg of compound (i-2) are charged, followed by sufficient deaeration under cooling with liquid nitrogen. Then, the temperature is raised to 40° C., followed by stirring for 24 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-6). The yield is 6.4 g. The density of polymer (F-6) is measured. The results are shown in Table 1.

Using polymer (F-6), polymer (H-6) and liquid composition (D-6) are obtained in the same manner as in Example 1. The ion exchange capacity of polymer (H-6) is measured. The results are shown in Table 1.

Example 7

Into a stainless steel autoclave having an internal capacity of 125 ml, 41.7 g of compound (m24-1), 31.3 g of compound (m1-1) and 25.0 mg of compound (i-1) dissolved in compound (s-1) at a concentration of 3.2 mass % are charged, followed by sufficient deaeration under cooling with liquid nitrogen. Then, the temperature is raised to 20° C., followed by stirring for 20 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-7). The yield is 5.9 g. The density of polymer (F-7) is measured. The results are shown in Table 1.

Using polymer (F-7), polymer (H-7) and liquid composition (D-7) are obtained in the same manner as in Example 1. The ion exchange capacity of polymer (H-7) is measured. The results are shown in Table 1.

Example 8

Into a stainless steel autoclave having an internal capacity of 125 ml, 11.71 g of compound (m21-1), 95.15 g of compound (m1-1) and 33 mg of compound (i-2) are charged, followed by sufficient deaeration under cooling with liquid nitrogen. Then, 0.6 g of TFE is charged, and the temperature is raised to 40° C., followed by stirring for 18 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-8). The yield is 11.5 g. The composition of repeating units constituting the copolymer is analyzed by $^{19}$F-NMR, whereupon the proportion of repeating units based on TFE is 10 mol %. The density of polymer (F-8) is measured. The results are shown in Table 1.

Using polymer (F-8), polymer (H-8) and liquid composition (D-8) are obtained in the same manner as in Example 1. The ion exchange capacity of polymer (H-8) is measured. The results are shown in Table 1.

Example 9

Into a stainless steel autoclave having an internal capacity of 125 mL, 49.64 g of compound (m3-1), 28.22 g of compound (s-1) and 38.9 mg of compound (i-1) dissolved in compound (s-1) at a concentration of 3.2 mass % were charged, followed by sufficient deaeration under cooling with liquid nitrogen. Then, the temperature was raised to 30° C., and TFE was introduced to the system to maintain the pressure under 0.37 MPaG. After stirring for 4.8 hours, the autoclave was cooled to terminate the reaction.

The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F-9). The yield was 15.0 g. The density of polymer (F-9) was measured. The results are shown in Table 1.

Using polymer (F-9), polymer (H-9) was obtained in the same manner as in Example 1. The ion exchange capacity of polymer (H-9) was measured. The results are shown in Table 1.

To polymer (H-9), a mixed solvent of ethanol and water (ethanol/water=70/30 mass ratio) was added to adjust the solid content concentration to 15 mass %, followed by stirring using an autoclave at 125° C. for 8 hours. Water was further added to adjust the solid content concentration to 7.0 mass % thereby to obtain liquid composition (D-9) having polymer (H-9) dispersed in a dispersion medium. The composition of the dispersion medium was ethanol/water=35/65 (mass ratio).

Example 10

Into a stainless steel autoclave having an internal capacity of 125 mL, 45.9 g of compound (m1-1), 16.5 g of compound (s-1) and 12.65 mg of compound (i-2) were charged, followed by sufficient deaeration under cooling with liquid nitrogen. Then, the temperature was raised to 40° C., and TFE was introduced to the system to maintain the pressure under 0.55 MPaG. After stirring at 40° C. for 4.3 hours, the gas in the system was purged, and the autoclave was cooled to terminate the reaction.

The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F-10). The yield was 6.5 g. The density of polymer (F-10) was measured. The results are shown in Table 1.

Using polymer (F-10), polymer (H-10) was obtained in the same manner as in Example 9. The ion exchange capacity of polymer (H-10) was measured. The results are shown in Table 1.

To polymer (H-10), a mixed solvent of ethanol, water and 1-butanol (ethanol/water/1-butanol=35/50/15 mass ratio) was added to adjust the solid content concentration to 15 mass %, followed by stirring using an autoclave at 125° C. for 8 hours. Water was further added to adjust the solid content concentration to 9 mass % thereby to obtain liquid composition (D-10) having polymer (H-10) dispersed in a dispersion medium. The composition of the dispersion medium was ethanol/water/1-butanol=20/70/10 (mass ratio).

Example 11

Into a stainless steel autoclave having an internal capacity of 125 ml, 11.47 g of compound (m21-1), 66.9 g of compound (m3-1) and 23 mg of compound (i-2) are charged, followed by sufficient deaeration under cooling with liquid nitrogen. Then, the temperature is raised to 40° C., followed by stirring for 24 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-11). The yield is 19.5 g. The density of polymer (F-11) is measured. The results are shown in Table 1.

Using polymer (F-11), polymer (H-11) and liquid composition (D-11) are obtained in the same manner as in Example 1. The ion exchange capacity of polymer (H-11) is measured. The results are shown in Table 1.

Example 12

Into a stainless steel autoclave having an internal capacity of 125 ml, 33.36 g of compound (m24-1), 52.58 g of compound (m1-1) and 30 mg of compound (i-1) dissolved in compound (s-1) at a concentration of 3.2 mass % are charged, followed by sufficient deaeration under cooling with liquid nitrogen. Then, the temperature is raised to 20° C., followed by stirring for 24 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-12). The yield is 6.1 g. The density of polymer (F-12) is measured. The results are shown in Table 1.

Using polymer (F-12), polymer (H-12) and liquid composition (D-12) are obtained in the same manner as in Example 1. The ion exchange capacity of polymer (H-12) is measured. The results are shown in Table 1.

Example 13

Into a stainless steel autoclave having an internal capacity of 125 ml, 27.8 g of compound (m24-1), 37.56 g of compound (m1-1) and 30 mg of compound (i-1) dissolved in compound (s-1) at a concentration of 3.2 mass % are charged, followed by sufficient deaeration under cooling with liquid nitrogen. Then, 8.0 g of tetrafluoroethylene is charged, and the temperature is raised to 20° C., followed by stirring for 8 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-13). The yield is 7.0 g. The composition of repeating units constituting the copolymer is analyzed by $^{19}$F-NMR, whereupon the proportion of repeating units based on TFE is 76 mol %. The density of polymer (F-13) is measured. The results are shown in Table 1.

Using polymer (F-13), polymer (H-13) and liquid composition (D-13) are obtained in the same manner as in Example 9. The ion exchange capacity of polymer (H-13) is measured. The results are shown in Table 1.

Example 14

Into a stainless steel autoclave having an internal capacity of 125 ml, 2.93 g of compound (m21-1), 75.1 g of compound (m1-1) and 23 mg of compound (i-2) are charged, followed by sufficient deaeration under cooling with liquid nitrogen. Then, the temperature is raised to 40° C., followed by stirring for 26 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-14). The yield is 6.1 g.

The density of polymer (F-14) is measured. The results are shown in Table 1.

Using polymer (F-14), polymer (H-14) and liquid composition (D-14) are obtained in the same manner as in Example 1. The ion exchange capacity of polymer (H-14) is measured. The results are shown in Table 1.

Example 15

Into a stainless steel autoclave having an internal capacity of 125 ml, 15.26 g of compound (m21-1), 45.98 of compound (m1-1) and 7.2 mg of compound (i-2) were charged, followed by sufficient deaeration under cooling with liquid nitrogen.

Then, the temperature was raised to 40° C., followed by stirring for 26 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-15). The yield was 10.2 g. The density of polymer (F-15) was measured. The results are shown in Table 1.

Using polymer (F-15), polymer (H-15) and liquid composition (D-15) were obtained in the same manner as in Example 1. The ion exchange capacity of polymer (H-15) was measured. The results are shown in Table 1.

TABLE 1

| Ex. | Ion exchange capacity (meq/g dry resin) | Density (g/cm$^3$) |
|---|---|---|
| 1 | 1.34 | 1.94 |
| 2 | 1.49 | 1.96 |
| 3 | 1.71 | 1.97 |
| 4 | 1.85 | 1.97 |
| 5 | 2.04 | 1.99 |
| 6 | 1.35 | 2.01 |
| 7 | 1.41 | 2.00 |
| 8 | 1.72 | 1.99 |
| 9 | 1.10 | 2.06 |
| 10 | 1.51 | 2.05 |
| 11 | 1.10 | 1.98 |
| 12 | 2.24 | 2.04 |
| 13 | 1.67 | 2.05 |
| 14 | 2.42 | 2.01 |
| 15 | 1.20 | 1.94 |

Example 16

39 g of water was added to 10 g of a supported catalyst having 50 mass % of platinum supported on a carbon powder, followed by irradiation with ultrasonic waves for 10 minutes to obtain a dispersion of the catalyst. To the dispersion of the catalyst, 60 g of liquid composition (D-1) was added, and 64 g of ethanol was further added to adjust the solid content concentration to 8 mass % to obtain a fluid for forming a catalyst layer. The fluid was applied on a separately prepared sheet comprising a copolymer of ethylene and TFE (tradename: Aflex 100N, manufactured by Asahi Glass Company, Limited, thickness: 100 μm) (hereinafter referred to as an ETFE sheet) and dried at 80° C. for 30 minutes and further subjected to heat treatment at 165° C. for 30 minutes to form a catalyst layer having an amount of platinum of 0.35 mg/cm$^2$.

Liquid composition (D-10) was applied on an ETFE sheet by means of a die coater, dried at 80° C. for 30 minutes and further subjected to heat treatment at 190° C. for 30 minutes to form a polymer electrolyte membrane having a thickness of 20 μm.

The ETFE sheet was separated from the polymer electrolyte membrane, the polymer electrolyte membrane was sandwiched between two catalyst layers provided with the ETFE sheet and heat pressed at a pressing temperature of 160° C. for a pressing time of 5 minutes under a pressure of 3 MPa to bond the catalyst layers on both sides of the polymer electrolyte membrane, and the ETFE sheets were separated from the catalyst layers to obtain a membrane/catalyst layer assembly having an electrode area of 25 cm$^2$.

On a gas diffusion layer comprising carbon paper, a carbon layer comprising carbon and polytetrafluoroethylene was formed.

The membrane/catalyst layer assembly was sandwiched between the gas diffusion layers so that the carbon layer and the catalyst layer were in contact with each other, to obtain a membrane/electrode assembly.

The membrane/electrode assembly was assembled into a cell for power generation, and the power generation characteristics were evaluated under the following two conditions.

(Evaluation Conditions 1)

While the temperature of the membrane/electrode assembly was maintained at 100° C., hydrogen (utilization ratio: 50%) was supplied to the anode and air (utilization ratio: 50%) was supplied to the cathode, under a pressure of 175 kPa (absolute pressure). Both hydrogen and air were supplied without being humidified, and the cell voltage when the current density was 1.0 A/cm$^2$ was recorded and evaluated under the following standards. The results are shown in Table 2.

⊚: Cell voltage being 0.6 V or higher.
◯: Cell voltage being 0.55 V or higher and less than 0.6 V.
Δ: Cell voltage being 0.5 V or higher and less than 0.55 V.
X: Cell voltage being 0.4 V or higher and less than 0.5 V.
X X: Cell voltage being less than 0.4 V.

(Evaluation Conditions 2)

While the temperature of the membrane/electrode assembly was maintained at 80° C., hydrogen (utilization ratio: 50%) was supplied to the anode and air (utilization ratio: 50%) was supplied to the cathode, under a pressure of 175 kPa (absolute pressure). Both hydrogen and air were supplied under a relative humidity of 100% RH, and the cell voltage when the current density was 1.5 A/cm$^2$ was recorded and evaluated under the following standards. The results are shown in Table 2.

◯: Cell voltage being 0.5 V or higher.
Δ: Cell voltage being less than 0.5 V.
X: No power generation conducted.

Examples 17 to 30

A membrane/electrode assembly is prepared and the power generation characteristics are evaluated in the same manner as in Example 16 except that liquid composition (D-1) used for formation of the catalyst layers is changed to each of liquid compositions (D-2) to (D-15). The evaluation results are shown in Table 2.

TABLE 2

| Ex. | Dispersion | Evaluation conditions 1 | Evaluation conditions 2 |
|---|---|---|---|
| 16 | D-1 | Δ | ◯ |
| 17 | D-2 | ◯ | ◯ |
| 18 | D-3 | ⊚ | ◯ |
| 19 | D-4 | ⊚ | ◯ |
| 20 | D-5 | ⊚ | Δ |
| 21 | D-6 | Δ | ◯ |
| 22 | D-7 | Δ | ◯ |
| 23 | D-8 | ⊚ | ◯ |
| 24 | D-9 | X X | ◯ |
| 25 | D-10 | X | ◯ |
| 26 | D-11 | X | ◯ |
| 27 | D-12 | Δ | X |
| 28 | D-13 | X | ◯ |
| 29 | D-14 | ⊚ | X |
| 30 | D-15 | X | ◯ |

The electrolyte material of the present invention is useful as an electrolyte material for a polymer electrolyte fuel cell. Further, it is also useful for other applications (such as a proton permselective membrane to be used for water electrolysis, hydrogen peroxide production, ozone production or waste acid recovery; a diaphragm for electrolysis of sodium chloride or a redox flow cell, or a cation exchange membrane for electrodialysis to be used for desalination or salt production).

The entire disclosures of Japanese Patent Application No. 2009-179066 filed on Jul. 31, 2009 and U.S. Provisional Patent Application No. 61/299,578 filed on Jan. 29, 2010 including specifications, claims, drawings and summaries are incorporated herein by reference in their entireties.

What is claimed is:

1. An electrolyte material, which comprises a polymer (H) having ion exchange groups converted from precursor groups in the following polymer (F), the polymer (H) having an ion exchange capacity of from 1.3 to 2.3 meq/g dry resin:

polymer (F): a polymer which has repeating units (A) based on a perfluoromonomer having a precursor group represented by the following formula (g1) and repeating units (B) based on a perfluoromonomer having a 5-membered ring or a perfluoromonomer capable of forming a 5-membered ring by cyclic polymerization, and which has a density of at most 2.03 g/cm³:

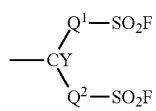

(g1)

wherein $Q^1$ is a perfluoroalkylene group which may have an etheric oxygen atom, $Q^2$ is a single bond or a perfluoroalkylene group which may have an etheric oxygen atom, and Y is a fluorine atom or a monovalent perfluoroorganic group.

2. The electrolyte material according to claim 1, wherein at least one type of repeating units having ion exchange groups converted from the precursor groups in the repeating units (A) are repeating units represented by the following formula (u1):

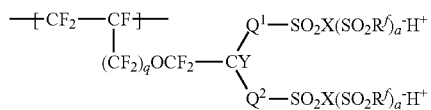

(u1)

wherein $R^f$ is a perfluoroalkyl group which may have an etheric oxygen atom, X is an oxygen atom, a nitrogen atom or a carbon atom, provided that when X is an oxygen atom, a=0, when X is a nitrogen atom, a=1, and when X is a carbon atom, a=2, and q is 0 or 1.

3. The electrolyte material according to claim 1, wherein each of $Q^1$ and $Q^2$ which are independent of each other, is a $C_{1-6}$ perfluoroalkylene group which may have an etheric oxygen atom.

4. The electrolyte material according to claim 3, wherein at least one of $Q^1$ and $Q^2$ is a $C_{1-6}$ perfluoroalkylene group having an etheric oxygen atom.

5. The electrolyte material according to claim 1, wherein at least one type of the repeating units (B) are repeating units represented by the following formula (u21):

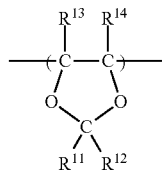

(u21)

wherein each of $R^{11}$ and $R^{12}$ which are independent of each other, is a fluorine atom or a $C_{1-5}$ perfluoroalkyl group, and each of $R^{13}$ and $R^{14}$ which are independent of each other, is a fluorine atom, a $C_{1-5}$ perfluoroalkyl group or a $C_{1-5}$ perfluoroalkoxy group.

6. The electrolyte material according to claim 5, wherein $R^{13}$ and $R^{14}$ are a fluorine atom.

7. The electrolyte material according to claim 5, wherein at least one type of the repeating units represented by the formula (u21) are repeating units represented by the following formula (u21-1):

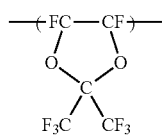

(u21-1)

8. The electrolyte material according to claim 1, wherein at least one type of the repeating units (B) are repeating units represented by the following formula (u22):

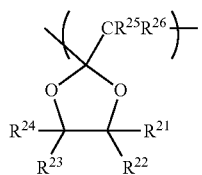

(u22)

wherein each of $R^{21}$ to $R^{26}$ which are independent of one another, is a monovalent perfluoroorganic group which may have an etheric oxygen atom, or a fluorine atom.

9. The electrolyte material according to claim 8, wherein at least one type of the repeating units represented by the formula (u22) are repeating units represented by the following formula (u22-1):

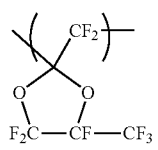

(u22-1)

10. The electrolyte material according to claim 1, wherein at least one type of the repeating units (B) are repeating units represented by the following formula (u24):

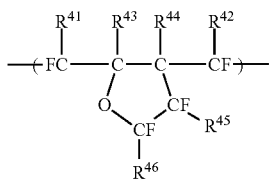

(u24)

wherein each of $R^{41}$ to $R^{46}$ which are independent of one another, is a monovalent perfluoroorganic group which may have an etheric oxygen atom, or a fluorine atom.

11. The electrolyte material according to claim 10, wherein at least one type of the repeating units represented by the formula (u24) are repeating units represented by the following formula (u24-1):

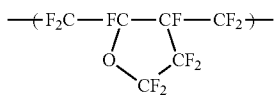

(u24-1)

12. The electrolyte material according to claim 1, wherein the polymer (F) further has repeating units based on tetrafluoroethylene.

13. A liquid composition comprising a dispersion medium and the electrolyte material as defined in claim 1 dispersed in the dispersion medium, wherein the dispersion medium contains an organic solvent having a hydroxy group.

14. A membrane/electrode assembly for a polymer electrolyte fuel cell, which comprises an anode having a catalyst layer containing a proton conductive polymer, a cathode having a catalyst layer containing a proton conductive polymer, and a polymer electrolyte membrane disposed between the anode and the cathode, wherein the proton conductive polymer contained in the catalyst layer of at least one of the cathode and the anode is the electrolyte material as defined in claim 1.

* * * * *